United States Patent
Hodge

(10) Patent No.: US 11,233,896 B2
(45) Date of Patent: Jan. 25, 2022

(54) SYSTEMS AND METHODS FOR DETECTING INMATE TO INMATE CONFERENCE CALLS

(71) Applicant: **Global Tel*Link Corporation**, Reston, VA (US)

(72) Inventor: Stephen Lee Hodge, Aubrey, TX (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

(21) Appl. No.: 16/989,399

(22) Filed: Aug. 10, 2020

(65) Prior Publication Data
US 2021/0029242 A1  Jan. 28, 2021

Related U.S. Application Data

(63) Continuation of application No. 16/189,524, filed on Nov. 13, 2018, now Pat. No. 10,742,801, which is a
(Continued)

(51) Int. Cl.
*H04M 3/22* (2006.01)
*G10L 25/51* (2013.01)
(Continued)

(52) U.S. Cl.
CPC .......... *H04M 3/2281* (2013.01); *G10L 17/00* (2013.01); *G10L 25/27* (2013.01); *G10L 25/51* (2013.01);
(Continued)

(58) Field of Classification Search
CPC ......... G10L 17/00; G10L 25/27; G10L 25/51; G10L 25/78; H04M 3/56; H04M 3/2281;
(Continued)

(56) References Cited

U.S. PATENT DOCUMENTS

| 5,535,261 A | 7/1996 | Brown et al. |
| 6,052,454 A | 4/2000 | Kek et al. |

(Continued)

OTHER PUBLICATIONS

"Application Examples," WG Systems, copyright 2001-2003, http://www.wgsystems.com.br/english/dc/wg_applic_exemp.htm#Corrections.
(Continued)

*Primary Examiner* — Hemant S Patel
(74) *Attorney, Agent, or Firm* — Sterne, Kessler, Goldstein & Fox P.L.L.C.

(57) ABSTRACT

A system for detecting inmate to inmate conference calls in a correctional facility is disclosed herein. The system includes a database and a conference call detection server, wherein the conference call detection server is configured to monitor a plurality of inmate communications, convert an audio signal of each inmate communication to a frequency domain signal, identify frequency data comprising one or more frequency peaks and corresponding frequency values in the frequency domain signal for each inmate communication, generate a record comprising the frequency data for each inmate communication, resulting in a plurality of records, store the plurality of records in the database, detect an inmate to inmate conference call by matching a frequency subset of a new inmate communication with frequency data in a detected record in the database, and verify the inmate to inmate conference call by matching audio with voice biometric samples.

17 Claims, 6 Drawing Sheets

Related U.S. Application Data continuation of application No. 15/686,938, filed on Aug. 25, 2017, now Pat. No. 10,129,392.

(51) Int. Cl.
| | |
|---|---|
| *G10L 25/27* | (2013.01) |
| *G10L 25/78* | (2013.01) |
| *G10L 17/00* | (2013.01) |
| *H04M 3/56* | (2006.01) |

(52) U.S. Cl.
CPC ............... *G10L 25/78* (2013.01); *H04M 3/56* (2013.01); *H04M 2201/41* (2013.01); *H04M 2203/301* (2013.01); *H04M 2203/556* (2013.01); *H04M 2203/558* (2013.01); *H04M 2203/6054* (2013.01)

(58) Field of Classification Search
CPC ....... H04M 2201/41; H04M 2203/301; H04M 2203/556; H04M 2203/558; H04M 2203/6054
USPC .................... 379/67.1–88.28, 202.01–207.01
See application file for complete search history.

(56) References Cited

U.S. PATENT DOCUMENTS

| | | | |
|---|---|---|---|
| 6,064,963 | A | 5/2000 | Gainsboro |
| 6,763,099 | B1 | 7/2004 | Blink |
| 7,039,171 | B2 | 5/2006 | Gickler |
| 7,085,359 | B2 | 8/2006 | Crites et al. |
| 7,106,843 | B1 | 9/2006 | Gainsboro et al. |
| 7,280,816 | B2 | 10/2007 | Fratti et al. |
| 7,366,782 | B2 | 4/2008 | Chong et al. |
| 7,529,357 | B1 | 5/2009 | Rae et al. |
| 7,627,477 | B2 * | 12/2009 | Wang .................. G06K 9/00536 341/110 |
| 7,804,941 | B2 | 9/2010 | Keiser et al. |
| 7,805,457 | B1 | 9/2010 | Viola et al. |
| 7,899,167 | B1 | 3/2011 | Rae |
| 8,031,052 | B2 | 10/2011 | Polozola |
| 8,498,937 | B1 | 7/2013 | Shipman, Jr. et al. |
| 8,917,848 | B2 | 12/2014 | Torgersrud et al. |
| 9,094,500 | B1 | 7/2015 | Edwards |
| 9,232,051 | B2 | 1/2016 | Torgersrud et al. |
| 9,300,791 | B1 | 3/2016 | Higgs |
| 9,307,386 | B2 | 4/2016 | Hodge et al. |
| 10,129,392 | B1 * | 11/2018 | Hodge ..................... G10L 25/51 |
| 10,742,801 | B2 * | 8/2020 | Hodge ................. H04M 3/2281 |
| 2001/0036821 | A1 | 11/2001 | Gainsboro et al. |
| 2002/0071537 | A1 | 6/2002 | Gainsboro |
| 2003/0126470 | A1 | 7/2003 | Crites et al. |
| 2004/0029564 | A1 | 2/2004 | Hodge |
| 2004/0114740 | A1 | 6/2004 | Gickler |
| 2005/0039036 | A1 | 2/2005 | Eisen |
| 2007/0071206 | A1 | 3/2007 | Gainsboro et al. |
| 2009/0202060 | A1 | 8/2009 | Kim et al. |
| 2011/0276323 | A1 | 11/2011 | Seyfetdinov |
| 2011/0286585 | A1 | 11/2011 | Hodge |
| 2012/0262271 | A1 | 10/2012 | Torgersrud et al. |
| 2013/0044867 | A1 * | 2/2013 | Walters ............... H04M 3/2281 379/88.08 |
| 2013/0078912 | A1 | 3/2013 | San Vicente et al. |
| 2014/0247926 | A1 | 9/2014 | Gainsboro et al. |
| 2014/0273929 | A1 | 9/2014 | Torgersrud |
| 2014/0287715 | A1 | 9/2014 | Hodge et al. |
| 2019/0149655 | A1 | 5/2019 | Hodge |

OTHER PUBLICATIONS

"Conversational Voice-Access Solutions that Attract and Retain Customers: Correction Facilities," Web for Phone, http://www.webforphone.com/uses/corrections.asp.

"Ivvis," TEM Systems, Inc., copyright 2003, http://www.temsystems.com/inmate.htm.

"Networked Multimedia Communication, Telejustice and Security Solutions," Vugate, http://www.vugate.com/index2.htm.

"Quality Turnkey Solutions from Experienced Telecommunication Professionals for All Your Video, Data, Voice, Security, Networking, and Wireless LAN, MAN, and WAN Applications," Telecom Engineering Consultants, copyright 2002, http://www.tec-inc.com/.

"TODD Video Network Management, Inc. Announces New Product TC Reliance Video Visitation Manager 1.0," Press Release, Apr. 23, 2003, http://www.toddvnm.com/pr/042320032.htm.

"Video Visitation Voice Scheduling," TEM Systems, Inc., http://www.temsystems.com/inmate%20voice%20scheduling.htm.

"Criminal Calls: A Review of the Bureau of Prisons' Management of Inmate Telephone Privileges," U.S. Department of Justice, Office of the Inspector General, Aug. 1999.

Beek et al., "An Assessment of the Technology of Automatic Speech Recognition for Military Applications," IEEE Transactions on Acoustics, Speech, and Signal Processing, vol. ASSP-25, No. 4, Aug. 1977; pp. 310-322.

Chen et al., "COPLINK: Managing Law Enforcement Data and Knowledge," Communications of the ACM, vol. 46, No. 1, Jan. 2003; pp. 28-34.

Complaint for Patent Infringement, filed Aug. 1, 2013, *Securus Technologies, Inc.* v. *Global Tel\*Link Corporation*, Case No. 3:13-CV-03009-K (N.D. Tex.).

File History of U.S. Pat. No. 7,805,457, U.S. Appl. No. 12/031,460, filed Feb. 14, 2008.

File History of U.S. Pat. No. 9,094,500, U.S. Appl. No. 14/322,869, filed Jul. 2, 2014.

Harper et al., "The Application of Link Analysis to Police Intelligence," Human Factors: The Journal of the Human Factors and Ergonomics Society, vol. 17, No. 2, 1975; pp. 157-164.

International Search Report and Written Opinion directed to International Patent Application No. PCT/US2017/029412, dated Jul. 7, 2017; 12 pages.

Jeanrenaud et al., "Spotting Events in Continuous Speech," IEEE International Conference on Acoustics, Speech, and Signal Processing, 1994; pp. 1381-1384.

Knox, "The Problem of Gangs and Security Threat Groups (STG's) in American Prisons Today: Recent Research Findings From the 2004 Prison Gang Survey," National Gang Crime Research Center, 2005; 67 pages.

Krebs, V. E., "Mapping Networks of Terrorist Cells", Connections vol. 24, No. 3, 2002; pp. 43-52.

Maghan, J., "Intelligence Gathering Approaches in Prisons," Low Intensity Conflict & Law Enforcement, vol. 3, No. 3, 1994; pp. 548-557.

Miller, C., "Shareable Intelligence: New and Improved Software Helps Police Fight Crime and Terrorism." Law Enforcement Technology vol. 32, No. 6, Jun. 2005; pp. 20, 22, 24-29.

Rey, R.F., ed., "Engineering and Operations in the Bell System," 2nd Edition, AT&T Bell Laboratories: Murray Hill, NJ, 1983.

Rohlicek et al., "Continuous Hidden Markov Modeling for Speaker-Independent Word Spotting." IEEE International Conference on Acoustics, Speech, and Signal Processing , 1989; pp. 627-630.

Rosenberg, et al., "SIP: Session Initial Protocol," Network Working Group, Standard Track, Jun. 2002; 269 pages.

Smith, Megan J., "Corrections Turns Over a New LEAF: Correctional Agencies Receive Assistance From the Law Enforcement Analysis Facility," Corrections Today, Oct. 1, 2001.

Sparrow, M. K., "The application of network analysis to criminal intelligence: An assessment of the prospects," Social Networks vol. 13, 1991; pp. 251-274.

Winterdyk et al., "Managing Prison Gangs," Journal of Criminal Justice, vol. 38, 2010; pp. 730-736.

Xu et al., "CrimeNet Explorer: A Framework for Criminal Network Knowledge Discovery," ACM Transactions on Information Systems, vol. 23, No. 2, Apr. 2005; pp. 201-226.

\* cited by examiner

SYSTEMS AND METHODS FOR DETECTING INMATE TO INMATE CONFERENCE CALLS

CROSS-REFERENCE TO RELATED APPLICATIONS

This application is a continuation application of U.S. patent application Ser. No. 16/189,524, filed on Nov. 13, 2018, which is a continuation application of U.S. patent application Ser. No. 15/686,938, filed on Aug. 25, 2017 (now U.S. Pat. No. 10,129,392), which are incorporated herein by reference in their entirety.

BACKGROUND

Field

The disclosure relates to systems and methods for detecting conference calls occurring between inmates in a plurality of correctional facilities based on frequency analysis.

Background

In a controlled environment, such as a correctional facility, inmates have limited opportunities to interact with the outside world. Inmates are allowed to communicate with friends, families, and/or loved ones through telephone calls as it improves recidivism and provides incentives for inmates to follow rules and policies of the correctional facility.

However, inmates often utilize telephone calls to communicate with restricted calling parties in order to engage in illicit activity outside of the prison, threaten parties of interest such as judges and attorneys, and witnesses, and/or communicate with inmates in other prison facilities regarding potential illegal activities. In order to maintain security, correctional facilities may prevent inmates from calling certain contacts by blacklisting or blocking telephone numbers of restricted calling parties. Nevertheless, inmates may circumvent such procedures set by the correctional facility and utilize three-way calling or conference calling schemes to communicate with restricted calling parties without having to dial telephone numbers that have been blocked.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
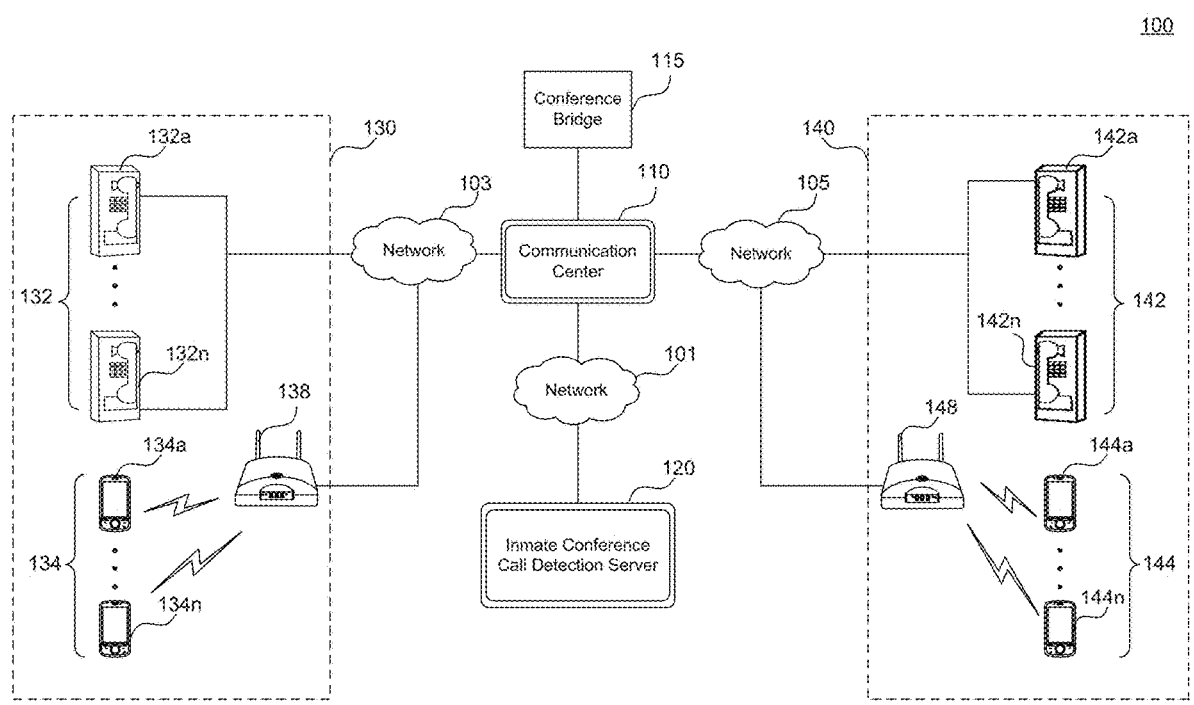
FIG. 1 illustrates a block diagram of an inmate conference call detection system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Inmate Conference Call Detection System

There is a need for new technologies, systems, and methods to enhance the detection of inmates communicating with restricted calling parties such that correctional facilities may intervene quickly and efficiently during calls where illegal activities may be occurring. Accordingly, FIG. 1 illustrates a block diagram of an inmate conference call detection system 100, according to embodiments of the present disclosure. Inmate conference call detection system 100 includes an inmate conference call detection server 120 configured to receive communication data from a communication center 110. In this disclosure, communication data refers to data collected during real-time audio communications between parties, such as voice calls between an inmate in a controlled environment (e.g., correctional facility) using inmate communication system 130 and an outsider using outsider communication system 140. In some embodiments, communication data includes the communication itself, such as audio of a voice calls, as well as data related to the voice call, as will be described in further detail below. In some embodiments, inmate conference call detection server 120 may be referred to as inmate-to-inmate conference call detection server 120 or conference call detection server 120 as described herein. The inmate conference call detection server 120 connects to the communication center 110 via a network 101. The network 101 includes at least one of a local area network (LAN), wireless area network (WAN), or the Internet.

In some embodiments, outsider communication system 140 may refer to a second inmate communication system of a second correctional facility that differs from the correctional facility of inmate communication system 130. The communication center 110 connects the inmate communication system 130 to the outsider communication system 140. For example, the communication center 110 facilitates call routing for parties within a correctional facility and outside parties, such as via devices within the inmate communication system 130 and outsider communication system 140. Inmate communication system 130 includes one or more communication devices available to inmates to perform voice calls within a correctional facility and includes any or all devices such as a plurality of telephones 132 (e.g., telephones 132a-132n) and a plurality of wireless communication devices 134 (e.g., wireless communication devices 134a-134n). In an embodiment, the telephones 132 comprise payphones and/or landline phones that are located locally within the correctional facility, such as in a designated area or room of the controlled environment. For example, the telephones 132 utilize analog "plain old telephony service" (POTS) lines or integrated services digital network (ISDN) lines. In another embodiment, the telephones 132 comprise Voice over Internet (VoIP) phones and communicate using digital packet-based communication schemes.

Wireless communication devices 134, such as smart phones and other mobile communication devices, are also available to inmates to perform voice calls. These voice calls are routed through a wireless access point 138 (e.g., a router), in which the wireless access point 138 provides connectivity to the wireless communication devices 134. In some embodiments, the telephones 132 and/or the wireless communication devices 134 are located in an area of the correctional facility that is different from the location of the communication center 110 and/or inmate conference call detection server 120. The communication center 110 connects to the telephones 132 and wireless communication devices 134 in the inmate communication system 130 via a network 103. The network 103 comprises at least one of a LAN, WAN, or the Internet. The communication center 110 also connects to the outsider communication system 140. Outsider communication system 140 includes one or more communication devices available to outsiders or individuals external to the correctional facility and/or outside of the inmate communication system 130. For example, outsiders include individuals outside of the correctional facility or inmates located in another correctional facility that is different from the correctional facility of inmate communication system 130. In some embodiments, outsiders may include at least one of approved calling parties (e.g., individuals with whom inmates are permitted to contact and communicate), and restricted calling parties (e.g., individuals with whom inmates are restricted from contacting and communicating). Outsider communication system 140 includes communication devices, such as a plurality of telephones 142 (e.g., telephones 142a-142n) and a plurality of wireless communication devices 144 (e.g., wireless communication devices 144a-144n).

In an embodiment, the telephones 142 comprise payphones and/or landline phones that are located locally within a second correctional facility, such as in a designated area or room of the controlled environment. For example, the telephones 142 utilize analog "plain old telephony service" (POTS) lines or integrated services digital network (ISDN) lines. In another embodiment, the telephones 142 comprise Voice over Internet (VoIP) phones. The communication center 110 connects to the outsider communication system 140 via a network 105, in which the network 105 comprises at least one of a WAN, the Internet, and the Public Switched Telephone Network (PSTN). In an embodiment, the WAN facilitates communications with an outsider communication system 140 in other nearby prisons, such as correctional facilities within the same county, state, jurisdiction, or the like. For example, telephones 142 and/or wireless communication devices 144 located at other correctional facilities provide cross-facility visitations between inmates. In another embodiment, the PSTN is used to provide connectivity to the telephones 142 and wireless communication devices 144 over traditional data networks.

In some embodiments, inmates may utilize communication devices (e.g., telephone 132 or wireless communication device 134) in the inmate communication system 130 to communicate with a restricted calling party by using a conference bridge 115. For example, each inmate is restricted from contacting certain individuals, such as other inmates, judges, prosecuting attorneys, victims associated with legal proceedings against each inmate, witnesses associated with legal proceedings against each inmate, and other restricted calling parties. In order to evade such restrictions, inmates use their respective communication devices in the inmate communication system 130 to dial a phone number corresponding to conference bridge 115 in order to communicate with restricted calling parties in the outsider communication system 140.

The conference bridge 115 allows two or more inmates to communicate together by connecting communication devices together in a conference call. The conference bridge 115 and corresponding conference call can be set up by a third party who provides the conference call phone number and/or one or more access codes to the inmates who wish to communicate with each other. For example, a first inmate and a second inmate both dial the conference call phone number on their respective devices in inmate communication system 130 and outsider communication system 140, respectively, and the conference bridge 115 connects the first inmate and the second inmate together on a conference call. Thus, inmates are able to communicate with restricted contacts by using the conference bridge 115 and without having to dial the phone number of a restricted contact.

In other embodiments, inmates are solely able to dial phone numbers of approved calling parties that have been approved by the correctional facility. For example, inmates using inmate communication system 130 may be able to communicate with friends, family members, and/or loved ones and may solely be permitted to dial phone numbers corresponding to these approved calling parties. In order to circumvent the policies and regulations of the correctional facility and communicate with restricted calling parties, an inmate may use telephone 132 or wireless communication device 134 in inmate communication system 130 to dial a phone number that is listed on a whitelist of phone numbers for contacts with whom the inmate is allowed to communicate, and the phone call may be redirected or forwarded to another destination, such as the conference call phone number associated with the conference bridge 115. A restricted calling party (such as another inmate in a second correctional facility) can also use telephone 142 or wireless communication device 144 in outsider communication system 140 to dial into the conference call phone number associated with the conference bridge 115 by using similar call forwarding schemes. Thus, by using conference calls through conference bridge 115, inmates often circumvent security measures and regulations of correctional facilities in order to engage in illicit activity outside of the prison, threaten parties of interest such as judges and attorneys, and witnesses, and communicate with inmates in other prison facilities about possibly illegal activity.

In order to detect inmates communicating with restricted calling parties, inmate conference call detection server 120 is configured to analyze communication data obtained from voice calls occurring between inmates in inmate communication system 130 and outsiders (e.g., approved calling parties, restricted calling parties, and/or other inmates) in outsider communication system 140. The inmate conference call detection server 120 detects conference calls that may be occurring between inmates and restricted calling parties (e.g., inmate to inmate conference calls) based on the analyzed communication data and further utilizes voice biometrics data to verify the identities of inmates and/or restricted calling parties in the detected conferences calls, as will be described in further detail below.

Inmate Conference Call Detection Server and Example Power Spectrum

Figure 2:
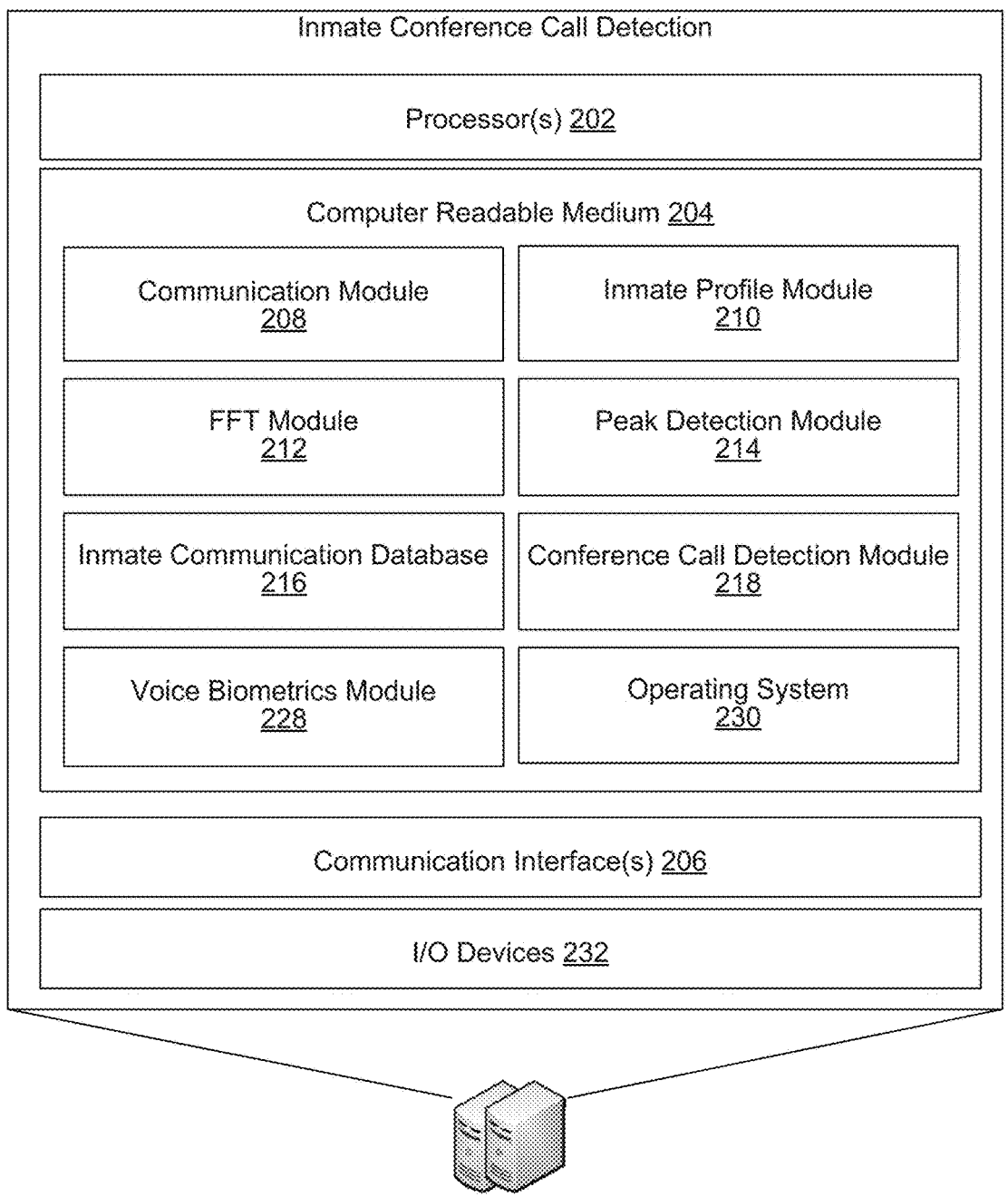
FIG. 2 illustrates a block diagram of an inmate conference call detection server in the inmate conference call detection system, according to embodiments of the present disclosure.

FIG. 2 illustrates a block diagram of the inmate conference call detection server 200, according to embodiments of the present disclosure. Inmate conference call detection server 200 represents an exemplary embodiment of inmate conference call detection server 120 in FIG. 1. Inmate conference call detection server 200 includes one or more servers or other types of computing devices that may be embodied in any number of ways. For instance, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the inmate conference call detection server 200 as being present in a single location, these components and data may alternatively be distributed across different computing devices and different locations in any manner. Consequently, the functions may be implemented by one or more computing devices, with the various functionality described above distributed in various ways across the different computing devices. Multiple inmate conference call detection servers 200 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, the inmate conference call detection server 200 includes one or more processors 202, one or more computer-readable media 204, and one or more communication interfaces 206. Each processor 202 is a single processing unit or a number of processing units, and may include single or multiple computing units or multiple processing cores. The processor(s) 202 can be implemented as one or more microprocessors, microcomputers, microcontrollers, digital signal processors, central processing units, state machines, logic circuitries, and/or any devices that manipulate signals based on operational instructions. For instance, the processor(s) 202 may be one or more hardware processors and/or logic circuits of any suitable type specifically programmed or configured to execute the algorithms and processes described herein. The processor(s) 202 can be configured to fetch and execute computer-readable instructions stored in the computer-readable media 204, which can program the processor(s) 202 to perform the functions described herein.

The computer-readable media 204 include volatile and nonvolatile memory and/or removable and non-removable media implemented in any type of technology for storage of information, such as computer-readable instructions, data structures, program modules, or other data. Such computer-readable media 204 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the inmate conference call detection server 200, the computer-readable media 204 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 204 is used to store any number of functional components that are executable by the processors 202. In many implementations, these functional components comprise instructions or programs that are executable by the processors and that, when executed, specifically configure the one or more processors 202 to perform the actions attributed above to the inmate conference call detection server 200. In addition, the computer-readable media 204 store data used for performing the operations described herein.

In the illustrated example, the computer-readable media 204 further includes communication module 208, inmate profile module 210, fast Fourier transform (FFT) module 212, peak detection module 214, inmate communication database 216, conference call detection module 218, and voice biometrics module 228. Communication module 208 receives and manages communication data for inmate communications in correctional facilities. Communication module 208 facilitates monitoring, processing, and/or recording of audio collected during voice calls between an inmate in a controlled environment using inmate communication system 130 and an outsider using outsider communication system 140. In some embodiments, communication module 208 receives inmate communication data, such as audio signals from inmate communications, from communication center 110. For example, communication module 208 receives an audio signal for each inmate communication in a plurality of inmate communications from communication center 110, and the audio signal of each inmate communication is represented as a time domain signal. In some cases, communication module 208 receives and stores inmate communication data (including time domain audio signals for each inmate communication) in the communication module 208 itself or in inmate communication database 216.

In additional embodiments, communication module 208 is also configured to perform decryption and/or encryption of communication data received from the communication center 110. In some cases, communication data includes audio signals collected during inmate communications and the metadata of each inmate communication. For example, communication module 208 decrypts communication data received from the communication center 110 to extract the audio signal for each inmate communication. The communication module 208 may also encrypt the communication data for security purposes and transmit the encrypted communication data to one or more computing devices associated with monitors, corrections officers, guards, or other employees of the correctional facility for additional review or investigation. In some embodiments, communication module 208 performs conversion of communication data received from the communication center 110 to different formats in order to extract and/or identify metadata from the communication data.

Metadata includes data associated with the communication data, which includes at least one of a date and time of the communication, a type of encoding (e.g., audio compression and decompression), a rate of encoding (e.g., bit rate), a location of devices utilized during the communication, which device(s) are being used for the communication (e.g., telephone 132 or wireless communication device 134), and other attributes or characteristics of the communication. In addition to obtaining and managing communication data, the communication module 208 communicates with inmate profile module 210, fast Fourier transform (FFT) module 212, peak detection module 214, inmate communication database 216, conference call detection module 218, and/or voice biometrics module 228 to provide the stored inmate communication data for further analysis.

Inmate profile module 210 obtains and stores profile information and inmate calling information for each inmate in the correctional facility. In some embodiments, inmate profile module 210 obtains profile information related to the inmates from one or more of (a) a jail management system (JMS) or an offender management system (OMS) operated by the jurisdiction of the correctional facility, (b) public database containing information on the inmates, or (c) a questionnaire provided by a web page, a personal approved number (PAN) list, or booking information. In some embodiments, profile information obtained by inmate profile module 210 includes personal information for each inmate, such as names, previous residences or correctional facilities, authorized contacts (e.g., including a name, identity, phone number, and the like for each authorized contact), family members, and languages. In additional embodiments, the inmate profile module 210 also obtains booking information or case information for each inmate, such as names, addresses, and contact information (e.g., phone numbers) of one or more attorneys, judges, witnesses, or other individuals pertinent to an inmate's case.

By collecting this information, the inmate profile module 210 is configured to determine, for each inmate, a whitelist of contacts that the inmate is allowed to contact (e.g., approved calling parties) and/or a blacklist of contacts that the inmate is restricted from contacting (e.g., restricted calling parties). For example, the whitelist and/or blacklist include names, identities, and phone numbers for each listed contact. In some cases, conference call detection module 218 and/or voice biometrics module 228 communicates with inmate profile module 210 (as described below) to access the whitelist and/or blacklist data to identify whether or not an inmate is violating rules of the correctional facility by conference calling a restricted calling party (e.g., a blacklisted contact).

Fast Fourier Transform (FFT) module 212 manages the conversion of audio signals of inmate communications to frequency domain signals. In particular, FFT module 212 receives audio signals for inmate communications from the communication module 208 and computes a fast Fourier transform (FFT) of each audio signal in the time domain. The FFT is a computationally efficient mathematical technique that converts digital information from the time domain to the frequency domain for rapid spectral analysis. Furthermore, the FFT is an algorithmic optimization of the discrete Fourier transform ("DFT"), in that the FFT produces the same results at the DFT by using fewer computations than the DFT. In particular, the DFT breaks down a digital signal into its frequency components (e.g., a summation of harmonically-related cosine and sine waves). For a discrete (e.g., digital) signal, x[t], with N samples, the DFT is defined as:

$$X[w_k] = \Sigma_{n=0}^{N-1} x[t_n] e^{-w_k t_n}, k=0,1,2,\ldots,N-1 \quad (1)$$

In equation (1), $x[t_n]$ is the signal in the time domain, $t_n$ is the $n_{th}$ sampling instant, $w_k$ is the $k_{th}$ frequency sample (e.g., the $k_{th}$ frequency component), and $X[w_k]$ is the DFT of the signal. The DFT computes a complex coefficient for each frequency component that comprises the time domain signal, and $e^{-jw_k t_n}$ can be broken down into a cosine and sine component (e.g., $e^{-jw_k t_n} = \cos(w_k t_n) + \sin(w_k t_n)$). Thus, the complex coefficient is a representation of a cosine and sine wave (each with a frequency $w_k$) that comprises the $k_{th}$ frequency component of the signal. The real component of the complex coefficient is the magnitude of the cosine wave, and the imaginary component of the complex coefficient is the magnitude of the sine wave.

The complex coefficient can also be used to calculate the overall magnitude and phase of the corresponding component. Specifically, the magnitude (or amplitude) of the component is the square root of the sum of the squares of the real and imaginary components of the corresponding coefficient divided by N samples:

$$\text{Magntitude} = \frac{\sqrt{Real^2 + Imaginary^2}}{N} \quad (2)$$

The phase is the cotangent of the imaginary component divided by the real component:

$$\text{Phase} = \cot\left(\frac{Imaginary}{Real}\right) \quad (3)$$

Thus, the FFT module 212 uses the mathematical properties of the DFT (or the FFT) to compute magnitude and phase for each component that comprises a digital signal. By computing the FFT of an audio signal of each inmate communication, the FFT module 212 converts the audio signal in the time domain to a frequency domain signal in order to obtain spectral data from the audio signal. For example, spectral data includes magnitudes and phases for real and imaginary components of complex coefficients of each frequency component of an audio signal. In some embodiments, the FFT module 212 applies a Fourier transform to the time domain signal of each inmate communication over a predetermined window of time for the inmate communication. For example, the predetermined window of time includes a 512 sample width of the audio signal or a 1024 sample width of the audio signal. The predetermined window of time for converting an audio signal from the time domain to the frequency domain may be different or the same for each inmate communication received by the FFT module 212. In some cases, FFT module 212 transmits the converted frequency domain signal and the resulting spectral data for each inmate communication to the peak detection module 214, such that the peak detection module 214 may perform spectral analysis of the frequency domain signals.

Figure 3:
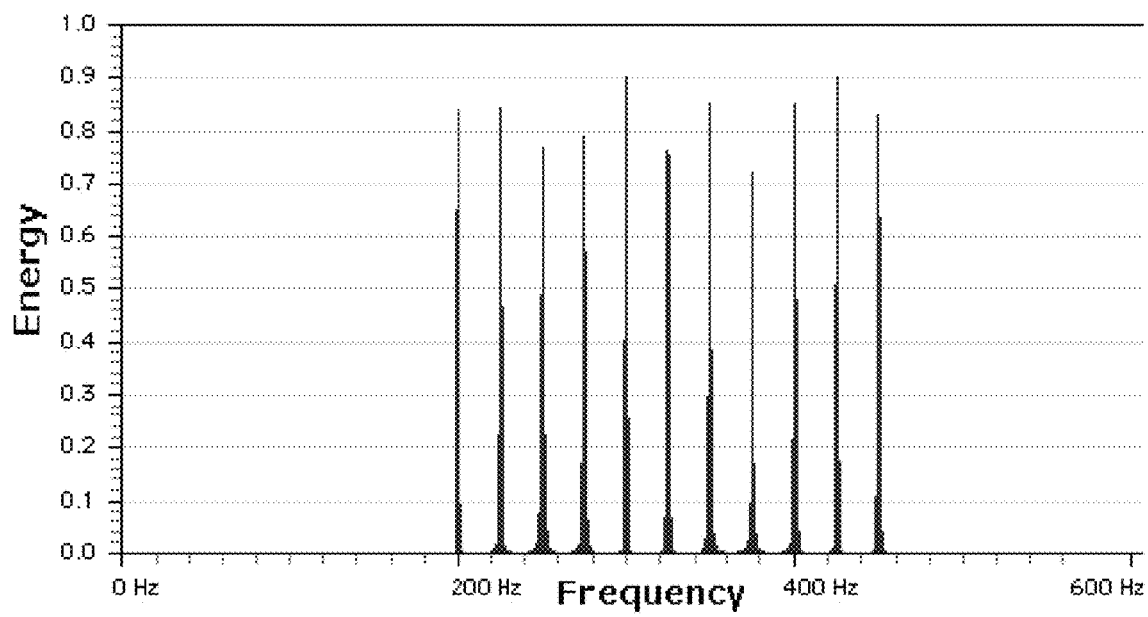
FIG. 3 illustrates an example power spectrum graph of frequencies detected during an inmate communication, according to embodiments of the present disclosure.

Peak detection module 214 detects frequency peaks and corresponding frequency values in frequency domain signals of inmate communications. In some embodiments, peak detection module 214 receives spectral data from the FFT module 212, including magnitudes and phases for real and imaginary components of complex coefficients of each frequency component of an audio signal. Using the spectral data, peak detection module 214 computes a power spectrum (e.g., a frequency spectrum graph) that plots the magnitude against frequency representation of the frequency domain signal obtained from each inmate communication. For example, FIG. 3 illustrates an example power spectrum graph 300 of frequencies detected during an inmate communication, according to embodiments of the present disclosure. In particular, the power spectrum graph 300 illustrates an example of frequency spectrums detected at a point in time during an inmate communication. The power spectrum graph 300 shows a plurality of frequency peaks of various magnitudes. Peak detection module 214 identifies one or more frequency peaks in a frequency domain signal for each inmate communication using a power spectrum graph, such as power spectrum graph 300.

In some cases, peak detection module 214 identifies frequency peaks in a frequency domain signal by applying a peak detection algorithm to identify the highest frequency peaks of the same amplitude. For example, peak detection module 214 identifies a first frequency peak in the frequency domain signal, a first frequency value corresponding to the first frequency peak, and a first amplitude value of the first frequency peak. The peak detection module 214 further identifies a second frequency peak in the frequency domain signal, a second frequency value corresponding to the second frequency peak, and a second amplitude value of the second frequency peak, wherein the first amplitude value and the second amplitude value are the same. In some cases, there may be several frequency peaks in the power spectrum, but peak detection module 214 may solely identify the frequency peaks of the highest amplitude (or magnitude) with respect to the other frequency peaks in the power spectrum. For example, with respect to the power spectrum graph 300 in FIG. 3, peak detection module 214 may identify two frequency peaks at 300 Hz and 420 Hz with the highest magnitude of 0.9 with respect to the magnitude values of the other frequency peaks in the power spectrum graph 300. In other cases, peak detection module 214 may identify multiple frequency peaks (e.g., more than two peaks) that are of the same amplitude (e.g., and the highest amplitude). In some embodiments, peak detection module 214 may detect all frequency peaks with an amplitude over a predetermined threshold value. For example, with respect to the power spectrum graph 300 in FIG. 3, peak detection module 214 may identify all peaks with an amplitude above 0.7 or another predetermined threshold value by applying a peak detection algorithm to the power spectrum graph 300. In some cases, peak detection module 214 may identify a frequency peak as a part of the frequency spectrum where a frequency value in the frequency domain signal is 3-4 dB higher (in amplitude) than the frequency values on either side of the peak. Additionally, peak detection module 214 communicates with inmate communication database 216 to store frequency data, including the one or more detected frequency peaks and frequency values for each inmate communication.

Inmate communication database 216 comprises any number of databases and/or servers, and stores and organizes data in one or more relational databases. Inmate communication database 216 runs a database management system, such as MYSQL™, to provide an example. In particular, inmate communication database 216 receives frequency data, including the one or more detected frequency peaks and frequency values for each inmate communication, from peak detection module 214 and generates records for each inmate communication. For example, inmate communication database 216 creates a record including frequency data regarding each detected frequency peak and the frequency value corresponding to each peak and stores each record. In some cases, inmate communication database 216 creates and manages a plurality of records for a plurality of inmate communications. The plurality of records in the inmate communication database 216 includes frequency information for calls received over a predetermined period of time, such as 30 days, one month, 6 months, one year, or any other time period. Additionally, the plurality of records may be updated by the inmate conference call detection server 200 periodically, such as every hour, day, week, or the like. The plurality of records managed and stored by inmate communication database 216 are accessible by conference call detection module 218 and/or voice biometrics module 228 in order to detect inmate to inmate conference calls and verify detected conference calls using voice biometrics.

Conference call detection module 218 detects inmate to inmate conference calls in correctional facilities. In particular, conference call detection module 218 detects inmate to inmate conference calls by determining whether portions of frequency domain signals for various inmate communications match each other. For example, conference call detection module performs frequency matching utilizing the frequency data identified by peak detection module 214 and stored in inmate communication database 216. In some embodiments, frequency matching refers to matching a frequency peak, a frequency value, and time point(s) in a frequency domain signal of an inmate communication with a frequency peak, a frequency value, and time point(s) in a frequency domain signal of another inmate communication. In some embodiments, conference call detection module 218 performs queries to search for and retrieve frequency data from the inmate communication database 216 for frequency matching. For example, inmate conference call detection server 200 may receive communication data regarding an inmate communication, and conference call detection module 218 queries the inmate communication database 216 to search for a record in the inmate communication database 216 that matches a portion of the frequency domain signal corresponding to the received inmate communication.

In some embodiments, conference call detection module 218 determines whether an inmate communication matches frequency data in a record in the inmate communication database 216 by querying for records of inmate phone calls that overlap at or near real-time with the inmate communication and have the same dialed phone number as the inmate communication. For example, conference call detection module 218 first queries the inmate communication database 216 by providing a list of parameters corresponding to the received inmate communication. The parameters may be related to the metadata of the inmate communication data received from communication center. For example, conference call detection module 218 may query the inmate communication database 216 by providing values corresponding to parameters, such as at least one of a date of the inmate communication, a time of the inmate communication, a type of encoding of the communication, a rate of encoding of the communication, a location of the device utilized during the communication, a phone number dialed during the communication, and the like. The conference call detection module 218 transmits the query including the specified parameter values to the inmate communication database 216, and the conference call detection module 218 receives a list of records from the inmate communication database 216 that match the specified parameter values. In some cases, by querying the inmate communication database 216, the conference call detection module 218 narrows down the number of records in the inmate communication database 216 that may match the received inmate communication data.

After performing the query, the conference call detection module 218 may have multiple records to parse through in order to detect conference calls, and the conference call detection module 218 utilizes each record to find matches of the frequency data of the received inmate communication with frequency data stored in each record. For example, the conference call detection module 218 performs frequency matching to determine whether a portion of the frequency domain signal corresponding to the received inmate communication matches a first subset of frequency data stored in a first record. The first record stores data regarding each frequency peak, each frequency value, and time point(s) at which each frequency peak occurs for an inmate communication. The conference call detection module 218 determines whether frequency peaks and frequency values of a portion of the frequency domain signal corresponding to the received inmate communication matches the first subset of frequency data stored in a first record.

In particular, the conference call detection module 218 identifies how many frequency peaks and values stored in a first record match with the frequency peaks and frequency values of the portion of the frequency domain signal corresponding to the received inmate communication. In some embodiments, a frequency match refers to a frequency peak, a frequency value, and time point(s) in a frequency domain signal of a first inmate communication that are the same as or similar to a frequency peak, a frequency value, and time point(s) in a frequency domain signal of a second inmate communication. Conference call detection module 218 identifies the number of frequency matches between two inmate communications and determines whether the number of frequency matches is above or below a predetermined threshold value. In some embodiments, a predetermined threshold value comprises a value for a number of matches that indicates that a sufficient number of frequency data points have been matched to detect an inmate to inmate conference call. For example, the predetermined threshold value may comprise 5, 10, 25, 50, or another value indicating that the number of frequency matches meets a mandatory level for inmate to inmate conference call detection.

If the conference call detection module 218 determines that the number of frequency matches is below the predetermined threshold value, then conference call detection module 218 matches the one or more frequency peaks and frequency values of the portion of the new frequency domain signal with another subset of frequency data stored in another record in inmate communication database 216. In particular, the conference call detection module 218 may continue to match the frequency peaks and frequency values of the portion of the new frequency domain signal with multiple subsets of frequency data (e.g., stored in multiple records in inmate communication database 216) until a sufficient number of frequency data points of the new frequency domain signal match with the frequency data in a particular subset. In other words, the conference call detection module 218 performs multiple iterations of frequency matching until the number of frequency matches is greater than or equal to the predetermined threshold value.

If the conference call detection module 218 determines that the number of frequency matches is above the predetermined threshold value, then conference call detection module 218 detects an inmate to inmate conference call between a first inmate and a second inmate. For example, the conference call detection module 218 detects that the first inmate (e.g., an inmate associated with the subset of frequency data stored in the first record) was conferenced in and/or communicating with a second inmate (e.g., an inmate associated with the received inmate communication). By identifying matching frequencies between frequency domain signals of various inmate communications, the conference call detection module 218 is configured to detect when inmates are circumventing policies of the correctional facility to communicate with others via conference calls.

In some embodiments, the conference call detection module 218 also communicates with inmate profile module 210 and/or voice biometrics module 228 to determine the identity of restricted calling parties with whom an inmate is communicating on a conference call. For example, the conference call detection module 218 accesses inmate profile module 210 to retrieve a blacklist of restricted calling parties and a white list of approved calling parties for an inmate to identify whether a called party is restricted or approved by the correctional facility. In some embodiments, the conference call detection module 218 communicates with voice biometrics module 228 to verify the identities of the inmate and the calling parties on a detected conference call, as will be described below.

Voice biometrics module 228 manages voice biometrics data and verifies the detection of inmate to inmate conference calls. For example, voice biometrics module 228 stores a voiceprint database comprising audio voiceprints of a plurality of inmates and a list of inmate identities corresponding to each audio voiceprint. In some embodiments, voice biometrics module 228 receives an alert or notification from conference call detection module 218 regarding a detected inmate conference call indicating matching frequencies between a received inmate communication and a record stored in the inmate communication database 216. Voice biometrics module 228 accesses a portion of the audio corresponding to the received inmate communication (e.g., from communication module 208) and also audio corresponding to the record stored in the inmate communication database 216. Voice biometrics module 228 then matches the two audio samples with audio voiceprints from the voiceprint database. For example, the voice biometrics module 228 matches the two audio samples with audio voiceprints corresponding to two inmates. In some embodiments, voice biometrics module 228 matches the audio samples with audio voiceprints by using combination of frequency estimation, hidden Markov models, Gaussian mixture models, pattern matching algorithms, neural networks, matrix representation methods, vector quantization, and/or decision tree methods.

Voice biometrics module 228 identifies a matching voiceprint from the database and a confidence value for each audio sample. The confidence value reflects the degree of match. A higher confidence value indicates a greater degree of matching than a lower confidence value. After the inmate identities have been determined using the voiceprints, the voice biometrics module 228 accesses inmate profiles corresponding to the two inmates from the inmate profile module 210 to identify restricted and approved calling parties in the detected inmate conference call. The voice biometrics module 228 may transmit notifications or alerts regarding the detected inmate to inmate conference call to one or more computing devices associated with monitors, corrections officers, guards, or other employees of the correctional facility for additional review or investigation.

Additional functional components stored in the computer-readable media 204 include an operating system 230 for controlling and managing various functions of the inmate conference call detection server 200. The inmate conference call detection server 200 also includes or maintains other functional components and data, such as other modules and data, which include programs, drivers, and the like, and the data used or generated by the functional components. Further, the inmate conference call detection server 200 includes many other logical, programmatic and physical components, of which those described above are merely examples that are related to the discussion herein.

The communication interface(s) 206 include one or more interfaces and hardware components for enabling communication with various other devices, including communication devices operated by inmates and called parties, such as telephones 132 and/or 142, wireless communication devices 134 and/or 144, or other computing devices, over network 103 or network 105. For example, communication interface(s) 206 facilitate communication through one or more of the Internet, cable networks, cellular networks, wireless networks (e.g., Wi-Fi, cellular) and wired networks. As several examples, the inmate conference call detection server 200 and communication devices communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, and the like. The inmate conference call detection server 200 may further be equipped with various input/output (I/O) devices 232. Such I/O devices include a display, various user interface controls (e.g., buttons, joystick, keyboard, mouse, touch screen, and the like), audio speakers, connection ports and so forth.

System Operation

Operations of generating frequency data from inmate communications and detecting inmate to inmate conference calls based on the frequency data through inmate conference call detection system 100 will be described with respect to FIGS. 4 and 5. Although the physical devices and components that form the system have largely already been described, additional details regarding their more nuanced operation will be described below with respect to FIGS. 1-3. While FIGS. 4 and 5 contain methods of operation of generating frequency data from inmate communications and detecting inmate to inmate conference calls based on the frequency data through inmate conference call detection server 200, the operations are not limited to the order described below, and various operations can be performed in a different order. Further, two or more operations of each method can be performed simultaneously with each other.

Figure 4:
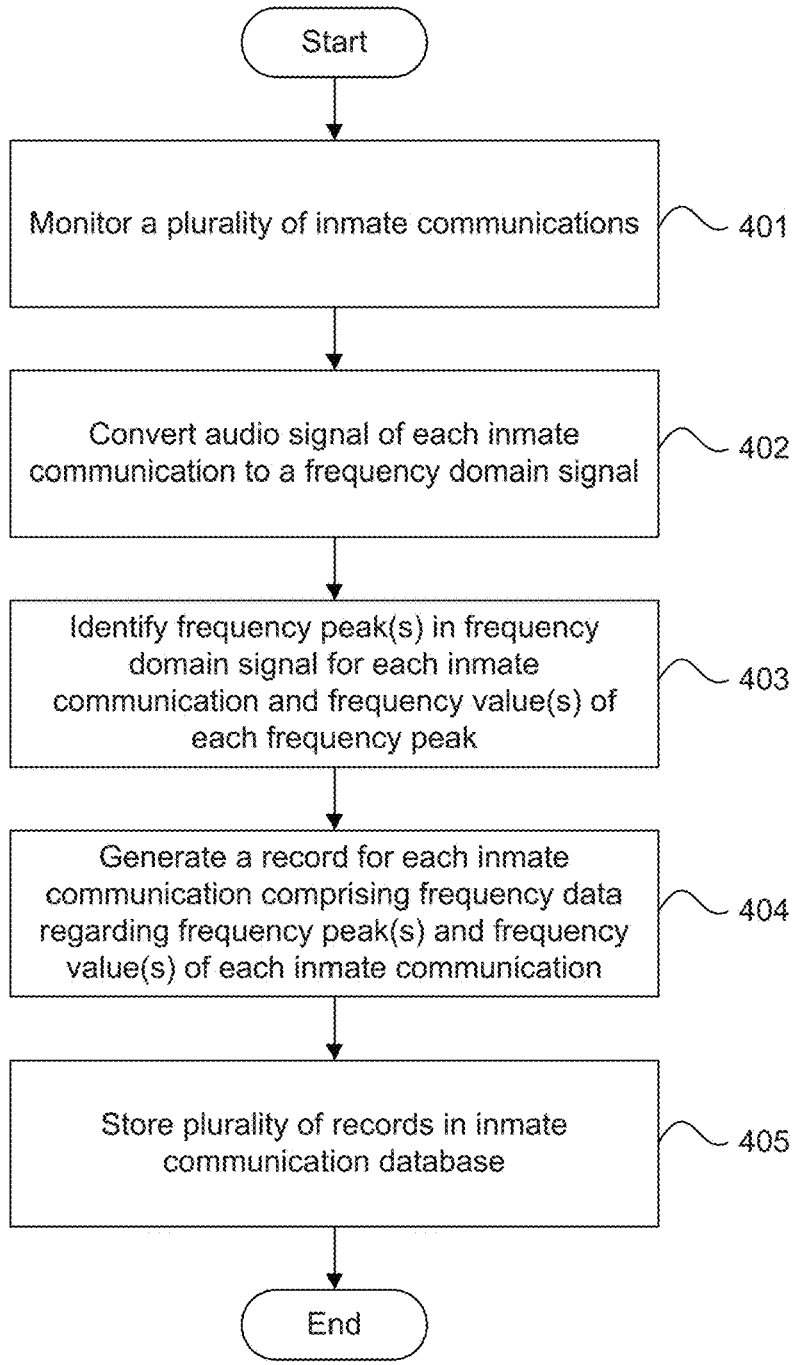
FIG. 4 illustrates a flowchart diagram of a method for generating frequency data from inmate communications for conference call detection, according to embodiments of the present disclosure.

FIG. 4 illustrates a flowchart diagram of a method 400 of generating frequency data from inmate communications for conference call detection, via a conference call detection server, such as inmate conference call detection server 200 of FIG. 2, according to embodiments of the present disclosure. The steps of method 400 are performed by modules of inmate conference call detection server 200, such as communication module 208, fast Fourier transform (FFT) module 212, peak detection module 214, and/or inmate communication database 216.

Method 400 of FIG. 4 begins with step 401 of monitoring a plurality of inmate communications. For example, communication module 208 of inmate conference call detection server 200 receives inmate communication data for a plurality of inmate communications from communication center 110, wherein each inmate communication comprises an audio signal. Each inmate communication includes a participating inmate from among a plurality of inmates in the correctional facility. In some cases, communication module 208 of inmate conference call detection server 200 receives the inmate communication data from an inmate communication device, such as telephone 132 or wireless communication device 134.

At step 402, the inmate conference call detection server converts the audio signal of each inmate communication to a frequency domain signal. For example, the FFT module 212 converts the audio signal of each inmate communication from a time domain signal to a frequency domain signal by applying a Fourier transform to the time domain over a predetermined window of time. At step 403, the inmate conference call detection server identifies one or more frequency peaks in the frequency domain signal for each inmate communication and frequency values corresponding to each frequency peak. For example, peak detection module 214 of inmate conference call detection server 200 identifies frequency peaks in a frequency domain signal by identifying the highest frequency peaks of the same amplitude in a power spectrum graph corresponding to the frequency domain signal of each inmate communication. The peak detection module 214 also identifies the frequency value of each of the frequency peaks of the same amplitude.

At step 404, the inmate conference call detection server generates a record for each inmate communication comprising frequency data regarding the one or more frequency peaks and frequency values of each inmate communication. For example, inmate communication database 216 receives frequency data regarding the one or more detected frequency peaks and frequency values for each inmate communication from the peak detection module 214. Using the frequency data, inmate communication database 216 creates a record including frequency data regarding each detected frequency peak and the frequency value corresponding to each peak, resulting in a plurality of records corresponding to a plurality of inmate communications.

At step 405, the inmate conference call detection server stores the plurality of records in the inmate communication database. For example, inmate conference call detection server 200 stores the plurality of records in the inmate communication database 216. The plurality of records stored in the inmate communication database 216 are accessible by conference call detection module 218 and/or voice biometrics module 228 in order to detect inmate to inmate conference calls and verify detected conference calls using voice biometrics.

Figure 5:
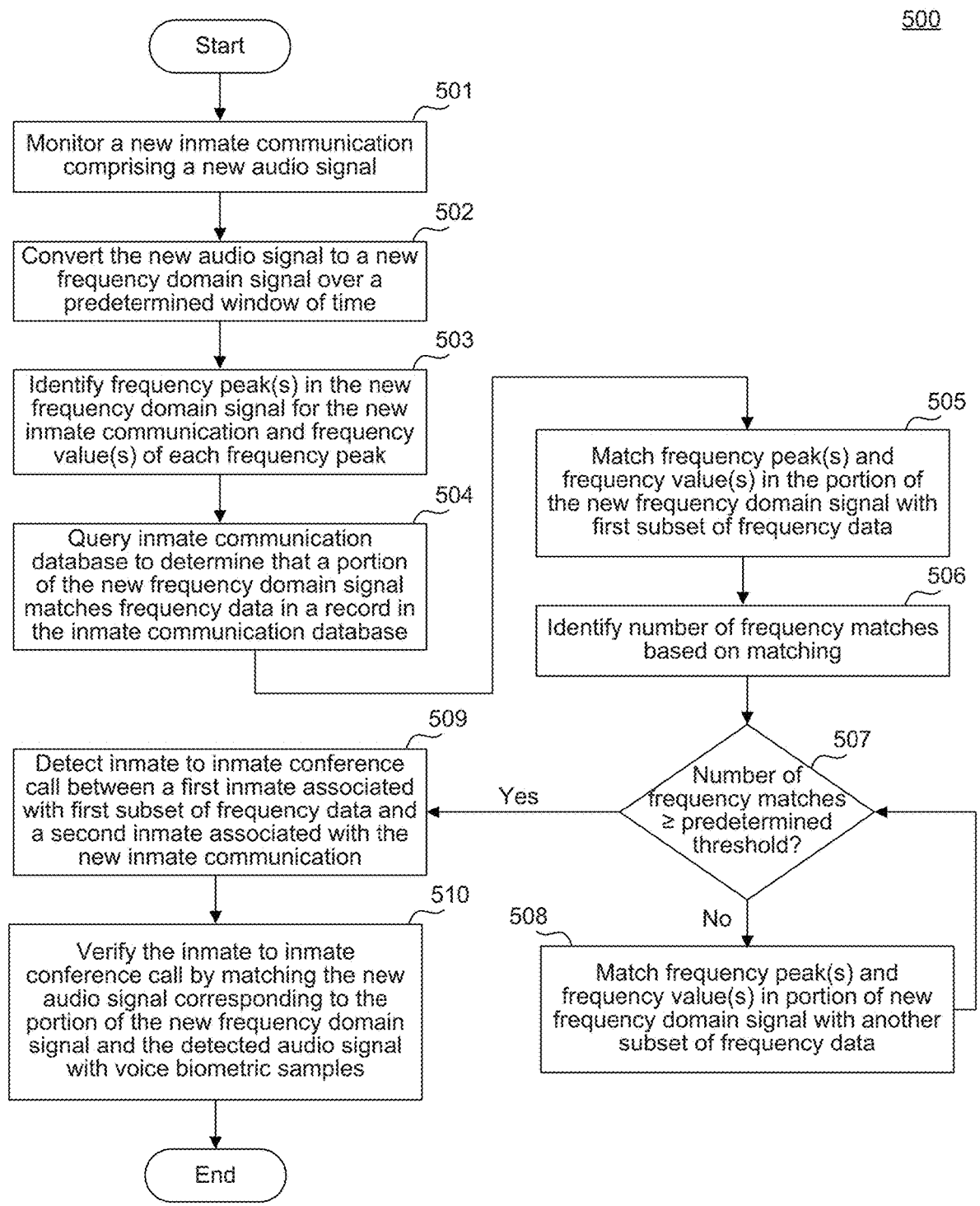
FIG. 5 illustrates a flowchart diagram of a method for detecting inmate to inmate conference calls based on frequency data from inmate communications, according to embodiments of the present disclosure.

FIG. 5 illustrates a flowchart diagram of a method 500 of detecting inmate to inmate conference calls based on frequency data from inmate communications, via a conference call detection server, such as inmate conference call detection server 200 of FIG. 2, according to embodiments of the present disclosure. The steps of method 500 are performed by modules of inmate conference call detection server 200, such as communication module 208, inmate profile module 210, fast Fourier transform (FFT) module 212, peak detection module 214, inmate communication database 216, and/or voice biometrics module 228. In some embodiments, the steps of method 500 may be performed after the steps of method 400 of generating frequency data from inmate communications and storing the frequency data as a plurality of records in inmate communication database 216.

Method 500 of FIG. 5 begins with step 501 of monitoring a new inmate communication comprising a new audio signal. For example, communication module 208 of inmate conference call detection server 200 receives inmate communication data for a new inmate communication from communication center 110, wherein the new inmate communication comprises a new audio signal. In some embodiments, communication module 208 of inmate conference call detection server 200 receives data for the new inmate communication from an inmate communication device, such as telephone 132 or wireless communication device 134. In some cases, a new inmate communication refers to an inmate communication received at or near real-time from an inmate communication device subsequent to the steps of method 400 in FIG. 4. In particular, the new inmate communication refers to a subsequent inmate communication received and/or monitored by inmate conference call detection server 200 after inmate conference call detection server 200 generates and stores a plurality of records for frequency data of inmate communications in inmate communication database 216.

At step 502, the inmate conference call detection server converts the new audio signal of the new inmate communication to a new frequency domain signal. For example, the FFT module 212 converts the new audio signal of the new inmate communication from a time domain signal to a frequency domain signal by applying a Fourier transform to the time domain over a predetermined window of time. At step 503, the inmate conference call detection server identifies one or more frequency peaks in the frequency domain signal for the new inmate communication and frequency values corresponding to each frequency peak. For example, peak detection module 214 of inmate conference call detection server 200 identifies frequency peaks in a frequency domain signal by identifying the highest frequency peaks of the same amplitude in a power spectrum graph corresponding to the frequency domain signal. The peak detection module 214 also identifies the frequency value of each of the frequency peaks of the same amplitude.

At step 504, the inmate conference call detection server queries an inmate communication database to determine that a portion of the new frequency domain signal matches frequency data in a detected record in the inmate communication database. For example, conference call detection module 218 of the inmate conference call detection server 200 queries the inmate communication database 216 to search for a record in the inmate communication database 216 with frequency data that matches a portion of the new frequency domain signal for the new inmate communication. The conference call detection module 218 determines that a portion of the new frequency domain signal for the new inmate communication matches frequency data in a detected record in inmate communication database 216, and the detected record includes a detected audio signal. The detected audio signal corresponds to an inmate communication associated with the detected record. At step 505, the inmate conference call detection server matches one or more frequency peaks and frequency values of the portion of the new frequency domain signal with a first subset of frequency data. For example, conference call detection module 218 of the inmate conference call detection server 200 matches one or more frequency peaks and frequency values of the portion of the new frequency domain signal with a first subset of frequency data stored in a first detected record in inmate communication database 216.

At step 506, the inmate conference call detection server identifies a number of frequency matches based on the matching. For example, conference call detection module 218 of the inmate conference call detection server 200 identifies how many frequency matches have been made during the matching at step 505. In particular, conference call detection module 218 identifies the number of matching frequency peaks between the frequency peaks and frequency values of the portion of the new frequency domain signal and the frequency peaks and frequency values of the first subset of frequency data stored in the first detected record in inmate communication database 216. At step 507, the inmate conference call detection server determines whether the number of frequency matches is above or below a predetermined threshold value. For example, conference call detection module 218 of the inmate conference call detection server 200 determines whether the number of frequency matches is above or below the predetermined threshold value in order to identify whether a sufficient number of frequency data points have been matched to detect an inmate to inmate conference call.

If the inmate conference call detection server determines that the number of frequency matches is below the predetermined threshold value, then method 500 in this example proceeds to step 508. At step 508, the inmate conference call detection server matches the one or more frequency peaks and frequency values of the portion of the new frequency domain signal with another subset of frequency data. For example, conference call detection module 218 of the inmate conference call detection server 200 matches one or more frequency peaks and frequency values of the portion of the new frequency domain signal with another subset of frequency data stored in another detected record (e.g., a second detected record) in inmate communication database 216. In particular, the conference call detection module 218 may continue to match the frequency peaks and frequency values of the portion of the new frequency domain signal with multiple subsets of frequency data (e.g., stored in multiple records in inmate communication database 216) until a sufficient number of frequency data points of the new frequency domain signal match with the frequency data in a particular subset. In other words, the conference call detection module 218 performs multiple iterations of frequency matching at step 508 until the number of frequency matches is greater than or equal to the predetermined threshold value.

If the inmate conference call detection server determines that the number of frequency matches is greater than or equal to the predetermined threshold value, then method 500 in this example proceeds to step 509. At step 509, the inmate conference call detection server detects an inmate to inmate conference call between a first inmate associated with the first subset of frequency data and a second inmate associated with the new inmate communication. For example, conference call detection module 218 of the inmate conference call detection server 200 detects that the first inmate associated with the first subset of frequency data participated in a conference call with the second inmate associated with the new inmate communication in response to determining that the number of frequency matches is above the predetermined threshold value.

At step 510, the inmate conference call detection server verifies the inmate to inmate conference call by matching the new audio signal corresponding to the portion of the new frequency domain signal and the detected audio signal (e.g., the audio signal corresponding to the first detected record) with voice biometric samples. For example, voice biometrics module 228 of the inmate conference call detection server 200 verifies the inmate to inmate conference call by matching a portion of the new audio signal corresponding to the portion of the new frequency domain signal and the detected audio signal with voice biometric samples. The voice biometrics module 228 stores audio voiceprints of a plurality of inmates and a list of inmate identities corresponding to the audio voiceprints. In particular, the voice biometrics module 228 verifies the inmate to inmate conference call by matching the new audio signal with an audio voiceprint corresponding to the second inmate associated with the new inmate communication and matching the detected audio with another audio voiceprint corresponding to the first inmate associated with the first subset of frequency data.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 6:
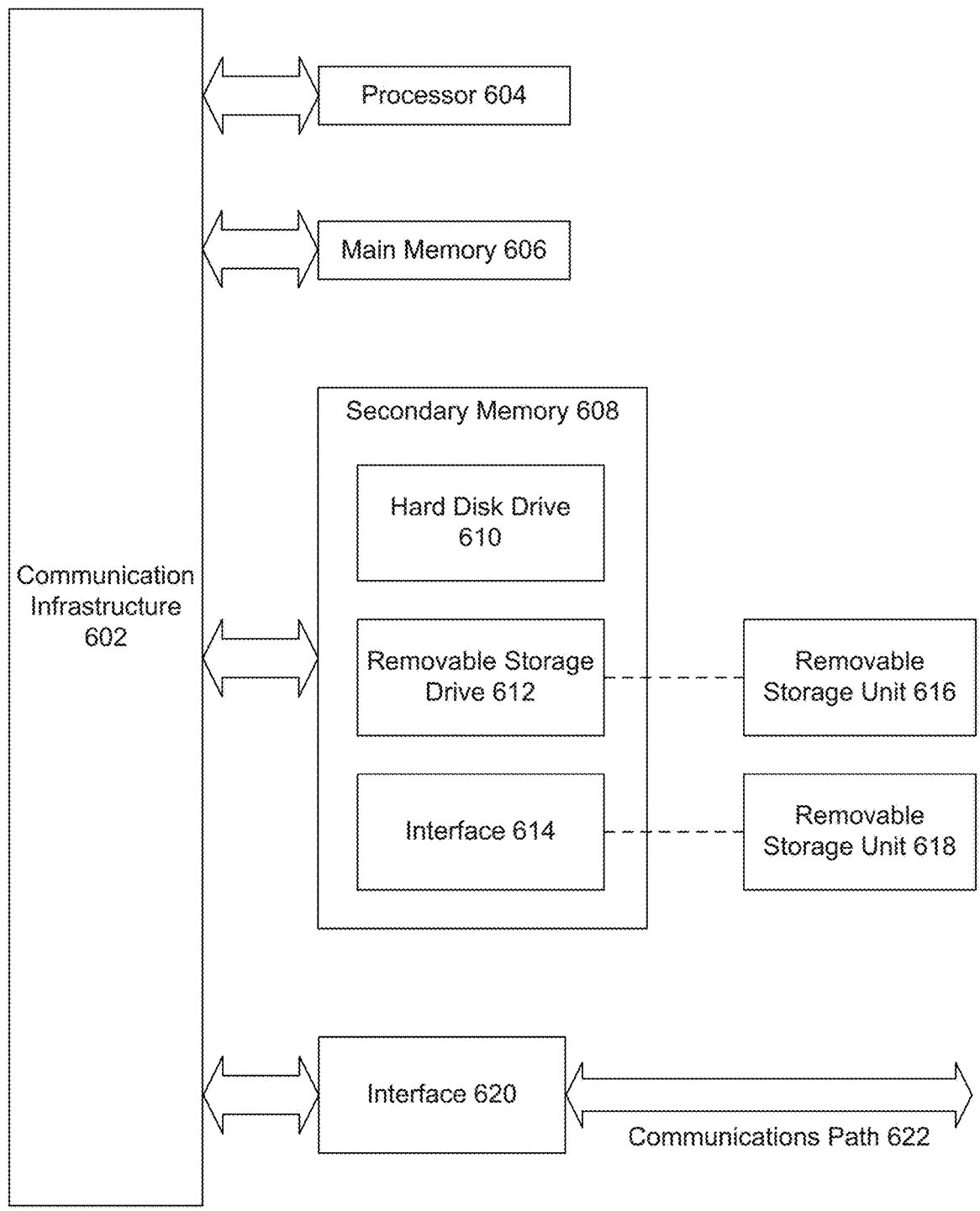
FIG. 6 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-5 can be implemented in the environment of one or more computer systems or other processing systems. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for detecting inmate to inmate conference calls, the system comprising:
   an inmate communication database storing a plurality of records corresponding to inmate communications at a plurality of correctional facilities;
   an inmate communication device associated with a first inmate in a first correctional facility; and
   a conference call detection server comprising at least one processor and a memory, wherein the at least one processor is configured to:
   receive inmate communication data of the first inmate from the inmate communication device;
   convert an audio signal of the inmate communication data to a frequency domain signal;
   query the inmate communication database using parameter values corresponding to the inmate communication data;
   receive a list of records from the inmate communication database based on the querying, wherein the list of records comprises a subset of the plurality of records with data matching one or more of the parameter values;
   determine that a portion of the frequency domain signal matches frequency data in a first detected record in the list of records; and
   detect an inmate to inmate conference call between the first inmate and a second inmate at a second correctional facility based on the determination, wherein the inmate to inmate conference call comprises a conference call connecting the first inmate and the second inmate together by a conference bridge, wherein the inmate to inmate conference call is initiated by at least one of the first inmate or the second inmate dialing a phone number corresponding to the conference bridge, and wherein the parameter values corresponding to the inmate communication data comprise a date of an inmate communication corresponding to the inmate communication data, a time of the inmate communication, a type of encoding of the inmate communication, a rate of encoding of the inmate communication, a location of the inmate communication device utilized during the inmate communication, and the phone number dialed during the inmate communication.

2. The system of claim 1, wherein to determine that the portion of the frequency domain signal matches the frequency data, the at least one processor is configured to:
   match frequency peaks and frequency values of the portion of the frequency domain signal with a first subset of frequency data stored in the first detected record;
   identify a number of frequency matches based on the matching; and
   determine whether the number of frequency matches is above or below a predetermined threshold value.

3. The system of claim 2, wherein the at least one processor is further configured to:
   detect the inmate to inmate conference call between the first inmate and the second inmate associated with the first subset of frequency data in response to determining that the number of frequency matches is above the predetermined threshold value.

4. The system of claim 2, wherein the at least one processor is further configured to:
   match the frequency peaks and the frequency values of the portion of the frequency domain signal with a second subset of frequency data stored in a second detected record in the list of records in response to determining that the number of frequency matches is below the predetermined threshold value.

5. The system of claim 1, wherein the inmate communication database is further configured to store voice biometric samples, and the at least one processor is further configured to:
   verify the detected inmate to inmate conference call by matching the audio signal with one or more of the voice biometric samples.

6. A method for detecting inmate to inmate conference calls in a plurality of correctional facilities, the method comprising:
receiving, at an inmate conference call detection server, inmate communication data from an inmate communication device of a first inmate in a first correctional facility;
converting an audio signal of the inmate communication data to a frequency domain signal;
querying an inmate communication database using parameter values corresponding to the inmate communication data, wherein the inmate communication database is configured to store a plurality of records corresponding to inmate communications at the plurality of correctional facilities;
receiving a list of records from the inmate communication database based on the querying, wherein the list of records comprises a subset of the plurality of records with data matching one or more of the parameter values;
determining that a portion of the frequency domain signal matches frequency data in a first detected record in the list of records; and
detecting an inmate to inmate conference call between the first inmate and a second inmate at a second correctional facility based on the determination, wherein the inmate to inmate conference call comprises a conference call connecting the first inmate and the second inmate together by a conference bridge, wherein the inmate to inmate conference call is initiated by at least one of the first inmate or the second inmate dialing a phone number corresponding to the conference bridge, and wherein the parameter values corresponding to the inmate communication data comprise a date of an inmate communication corresponding to the inmate communication data, a time of the inmate communication, a type of encoding of the inmate communication, a rate of encoding of the inmate communication, a location of the inmate communication device utilized during the inmate communication, and the phone number dialed during the inmate communication.

7. The method of claim 6, wherein the determining that the portion of the frequency domain signal matches the frequency data comprises:
matching frequency peaks and frequency values of the portion of the frequency domain signal with a first subset of frequency data stored in the first detected record;
identifying a number of frequency matches based on the matching; and
determining whether the number of frequency matches is above or below a predetermined threshold value.

8. The method of claim 7, further comprising:
detecting the inmate to inmate conference call between the first inmate and the second inmate associated with the first subset of frequency data in response to determining that the number of frequency matches is above the predetermined threshold value.

9. The method of claim 7, further comprising:
matching the frequency peaks and the frequency values of the portion of the frequency domain signal with a second subset of frequency data stored in a second detected record in the list of records in response to determining that the number of frequency matches is below the predetermined threshold value.

10. The method of claim 6, wherein each record of the plurality of records in the inmate communication database comprises data regarding one or more frequency peaks, frequency values, and time data regarding time points at which each frequency peak occurred for each inmate communication at the plurality of correctional facilities.

11. The method of claim 6, further comprising:
verifying the detected inmate to inmate conference call by matching the audio signal with one or more of voice biometric samples stored in the inmate communication database.

12. An inmate conference call detection server comprising:
an inmate communication database configured to store a plurality of records corresponding to inmate communications at a plurality of correctional facilities; and
at least one processor configured to:
receive inmate communication data from an inmate communication device of a first inmate in a first correctional facility;
convert an audio signal of the inmate communication data to a frequency domain signal;
query the inmate communication database using parameter values corresponding to the inmate communication data;
receive a list of records from the inmate communication database based on the querying, wherein the list of records comprises a subset of the plurality of records with data matching one or more of the parameter values;
determine that a portion of the frequency domain signal matches frequency data in a first detected record in the list of records; and
detect an inmate to inmate conference call between the first inmate and a second inmate at a second correctional facility based on the determination, wherein the inmate to inmate conference call comprises a conference call connecting the first inmate and the second inmate together by a conference bridge, wherein the inmate to inmate conference call is initiated by at least one of the first inmate or the second inmate dialing a phone number corresponding to the conference bridge, and wherein the parameter values corresponding to the inmate communication data comprise a date of an inmate communication corresponding to the inmate communication data, a time of the inmate communication, a type of encoding of the inmate communication, a rate of encoding of the inmate communication, a location of the inmate communication device utilized during the inmate communication, and the phone number dialed during the inmate communication.

13. The inmate conference call detection server of claim 12, wherein to determine that the portion of the frequency domain signal matches the frequency data, the at least one processor is configured to:
match frequency peaks and frequency values of the portion of the frequency domain signal with a first subset of frequency data stored in the first detected record;
identify a number of frequency matches based on the matching; and
determine whether the number of frequency matches is above or below a predetermined threshold value.

14. The inmate conference call detection server of claim 13, wherein the at least one processor is further configured to:
detect the inmate to inmate conference call between the first inmate and the second inmate associated with the first subset of frequency data in response to determining that the number of frequency matches is above the predetermined threshold value.

15. The inmate conference call detection server of claim 13, wherein the at least one processor is further configured to:
  match the frequency peaks and the frequency values of the portion of the frequency domain signal with a second subset of frequency data stored in a second detected record in the list of records in response to determining that the number of frequency matches is below the predetermined threshold value.

16. The inmate conference call detection server of claim 12, wherein each record of the plurality of records in the inmate communication database comprises data regarding one or more frequency peaks, frequency values, and time data regarding time points at which each frequency peak occurred for each inmate communication at the plurality of correctional facilities.

17. The inmate conference call detection server of claim 12, wherein the inmate communication database is further configured to store voice biometric samples, and the at least one processor is further configured to:
  verify the detected inmate to inmate conference call by matching the audio signal with one or more of the voice biometric samples.

* * * * *